B. DE BEER.
CONTROL LEVER AND CONTROLLING MECHANISM FOR AEROPLANES.
APPLICATION FILED NOV. 6, 1913.

1,126,179.

Patented Jan. 26, 1915.

Witnesses:

Inventor:
Bernard de Beer
by B. Singer Atty.

UNITED STATES PATENT OFFICE.

BERNARD DE BEER, OF VIRY-CHATILLON, FRANCE.

CONTROL-LEVER AND CONTROLLING MECHANISM FOR AEROPLANES.

1,126,179.  Specification of Letters Patent.  Patented Jan. 26, 1915.

Application filed November 6, 1913. Serial No. 799,523.

*To all whom it may concern:*

Be it known that I, BERNARD DE BEER, a subject of the Queen of the Netherlands, resident of Viry-Chatillon, Department of Seine-et-Oise, France, have invented certain new and useful Improvements in and Relating to Control-Levers and Controlling Mechanisms for Aeroplanes, of which the following is a specification.

My invention has for its object to provide an improved control lever mechanism for aeroplanes, for the purpose of effecting: 1. The control of the movements of the horizontal or elevating rudder. 2. The simultaneous alteration of the incidence of the two wings or the simultaneous deformation of the curvature of the said two wings, this variation of incidence or this deformation being at the will of the pilot, either combined with movements of the horizontal or elevating rudder, or independent of the movements of the said rudder; 3. The control of the warping of these wings, said warping being produced in the case of pivoting wings by the inverse variation of the incidence of each of these wings, whereby the entering angle of one of these wings is increased and the entering angle of the other wing is diminished.

Figure 1:
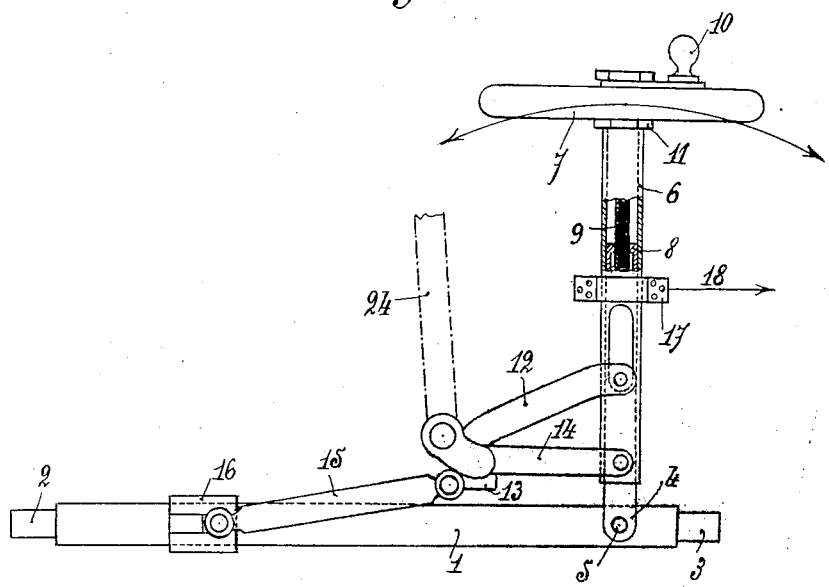
Figure 2:
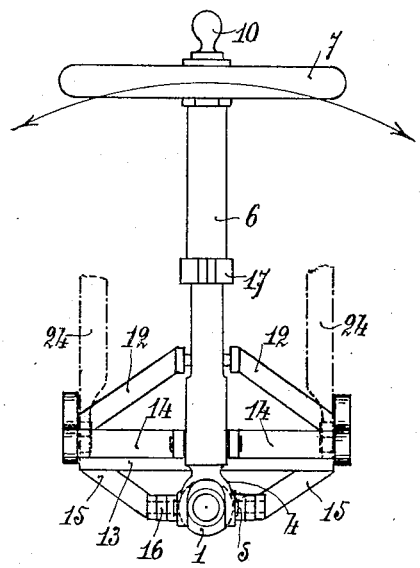
Figure 3:
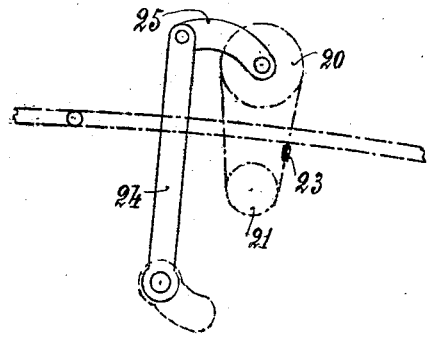

An embodiment of this invention is illustrated by way of example in the accompanying drawings, in which:

Figures 1 and 2 are views at right angles to each other of one form of the improved mechanism, and Fig. 3 shows a form of mechanism for operating the wings.

To a tube 1 which is capable of revolving on its two journals 2 and 3, there are jointed the two branches of a forked member 4 which is capable of rocking on its point of connection 5 to the said tube 1. This forked member 4 is situated at the end of a second tube 6 which constitutes the control lever proper. This control lever is provided at its other end with a hand rest 7, in the form of a hand wheel. The result of the construction just described is that this control lever being capable of being moved forward and backward and from right to left, is therefore able to assume any desired position in space.

In the interior of the tube 6 there is arranged a sliding block 8 which is capable of moving up and down in said tube. For this purpose this sliding block is formed as a nut for a screwed spindle 9 arranged in the same tube and adapted to be operated by means of a handle 10. Owing to the manner in which this spindle is mounted in a sleeve 11, the said spindle cannot advance, and therefore its rotation has the result of causing the slide block 8 to slide along the tube 6. To this slide block there are jointed rods 12 jointed at their other ends to a cross head 13 to which are also jointed the connecting rods for controlling the movement of the wings. This cross head is connected also by means of rods 14 to the lever 6.

A further jointed structure consisting of rods 15 and a slide block 16 which can move along the tube 1, serves to guide the whole mechanism when it is operated by the movements given to the control lever. A boss 17 fixed to this lever serves to connect to an operating rod 18 leading to the horizontal or elevating rudder. This rudder may be operated by means of rods, cables or any other similar device.

In the preceding arrangements, the connecting rods for controlling the movements of the wings are jointed to the ends of the cross head 13. This arrangement may if desired be replaced by the arrangement shown in Fig. 3, which is as follows: An arrangement of two pinions 20 and 21 is fixed to the body of framing of the aeroplane. These two pinions are connected to each other by means of a chain 22 provided with a tappet 23 for actuating the wings. The connecting rod 24 in being moved by the cross head 13 acts upon the crank 25 and alters the incidence of the wing that is actuated by the tappet 23. Each of the ends of the cross head 13 has jointed to it a connecting rod 24 for transmitting the motion to each of the wings. This arrangement thus allows: 1. Of varying the incidence of the wings by a conjugated motion of the horizontal or elevating rudder, this being effected by moving the control lever 6 from the front toward the rear; 2. Of varying the incidence of the wings independently of said rudder and simultaneously for each of the two wings, by acting upon the handle 10 so as to shift the slide block 8 which controls the connections of the connecting rods 24. 3. Of effecting the warping of these wings by inclining the lever either to the right or to the left in such a manner as to raise one of the ends of the cross head 13, while the other end is lowered.

Having now particularly described and ascertained the nature of my said invention and in what manner the same is to be performed, I declare that what I claim is:

1. A control lever mechanism for aeroplanes comprising a lever jointed to a shaft journaled at both ends in the body or framework of the aeroplane and adapted to be moved in any direction in space, and operating directly the horizontal or elevating rudder, in combination with a cross head to the ends of which the connecting rods for operating the wings are respectively jointed, said cross head being connected to the said lever by means of a jointed arrangement of mechanism fixed to a slide block which is adapted to move longitudinally on said lever.

2. A control lever mechanism for aeroplanes, comprising a hollow shaft serving as a lever jointed to a shaft that is journaled at both ends, means connecting directly with the horizontal or elevating rudder, a slide block in the form of a nut on a screw threaded spindle arranged inside the hollow shaft and adapted to be operated by hand, the said slide block being connected by means of a jointed arrangement of mechanism to a cross head controlling the variation of incidence of the wings, and guiding means designed to prevent all lateral displacement of the jointed arrangement of mechanism, during its operation.

3. A control lever mechanism for aeroplanes, comprising a hollow shaft serving as a lever jointed to a second shaft that is journaled at both ends, a screw threaded spindle inside the hollow shaft for actuating a slide block that is jointed to rods connected to the ends of a cross head to which are connected connecting rods for controlling the movement of the wings, another pair of rods connecting the cross head to the hollow lever shaft, and a jointed arrangement of mechanism composed of two rods connected to the cross head and fixed to a slide block slidable along the shaft which supports the joint of the hollow shaft.

In testimony whereof I affix my signature in presence of two witnesses.

BERNARD DE BEER.

Witnesses:
  HANSON C. COXE,
  EDWARD WOLF.